US008507642B2

(12) United States Patent
Marchionni et al.

(10) Patent No.: US 8,507,642 B2
(45) Date of Patent: Aug. 13, 2013

(54) (PER)FLUORINATED ADDITION PRODUCTS

(75) Inventors: Giuseppe Marchionni, Milan (IT); Marco Avataneo, Senago (IT); Pier Antonio Guarda, Arese (IT)

(73) Assignee: Solvay Solexis S.p.A., Bollate (IT)

( * ) Notice: Subject to any disclaimer, the term of this patent is extended or adjusted under 35 U.S.C. 154(b) by 286 days.

(21) Appl. No.: 12/921,938

(22) PCT Filed: Mar. 13, 2009

(86) PCT No.: PCT/EP2009/052998
§ 371 (c)(1),
(2), (4) Date: Sep. 10, 2010

(87) PCT Pub. No.: WO2009/112577
PCT Pub. Date: Sep. 17, 2009

(65) Prior Publication Data
US 2011/0015107 A1 Jan. 20, 2011

(30) Foreign Application Priority Data
Mar. 14, 2008 (EP) ..................... 08152771

(51) Int. Cl.
*C08G 65/22* (2006.01)
*C08G 73/24* (2006.01)
*C08G 65/00* (2006.01)
*C08G 73/00* (2006.01)

(52) U.S. Cl.
USPC ............ 528/402; 528/401; 528/397; 528/425

(58) Field of Classification Search
USPC .................. 528/402, 401, 397, 425
See application file for complete search history.

(56) References Cited

U.S. PATENT DOCUMENTS

| 3,214,478 A | 10/1965 | Milian |
| 3,242,218 A | 3/1966 | Miller |
| 3,442,942 A | 5/1969 | Sianesi et al. |
| 3,650,928 A | 3/1972 | Sianesi et al. |
| 3,665,041 A | 5/1972 | Sianesi et al. |
| 3,715,378 A | 2/1973 | Belardinelli et al. |
| 3,720,646 A | 3/1973 | Sianesi et al. |
| 3,847,978 A | 11/1974 | Sianesi et al. |
| 4,451,646 A | 5/1984 | Sianesi et al. |
| 4,523,039 A | 6/1985 | Lagow et al. |
| 5,000,830 A | 3/1991 | Marchionni et al. |
| 5,144,092 A | 9/1992 | Marraccini et al. |
| 5,258,110 A | 11/1993 | Sianesi et al. |
| 5,744,651 A | 4/1998 | Marchionni et al. |
| 7,329,784 B2 | 2/2008 | Marchionni et al. |
| 2005/0192413 A1 | 9/2005 | Marchionni et al. |

FOREIGN PATENT DOCUMENTS

| CA | 786877 A | 6/1968 |
| EP | 148482 A2 | 7/1985 |
| EP | 769520 A1 | 4/1997 |
| EP | 860436 A1 | 8/1998 |
| EP | 1454938 A | 9/2004 |
| EP | 1524287 A1 | 4/2005 |
| EP | 1568725 A1 | 8/2005 |
| GB | 1226566 A | 3/1971 |
| WO | WO 8700538 A1 | 1/1987 |
| WO | WO 9215627 A1 | 9/1992 |
| WO | WO 9705122 A1 | 2/1997 |

OTHER PUBLICATIONS

Kobrina, L. S.—"Some Peculiarities of Radical Reactions of Polyfluoroaromatic Compounds", J. Fluorine Chemistry, 1989, vol. 42, Elsevier Sequoia; p. 301-344, 44 pgs.
Brooke G. M.—"The preparation and properties of polyfluoro aromatic and heteroaromatic compounds", J. Fluorine Chemistry, 1997, vol. 86, Elsevier Science SA; p. 1-76, 76 pgs.
Snyder C.E. Jr.et al.—"Development of Polyperfluoroalkylethers as High Temperature Lubricants and Hydraulic Fluids", ASLE Transactions, 1976, vol. 19(3), p. 171-180; 10 pgs.
Standard ASTM D445-06—"Standard Test Method for Kinematic Viscosity of Transparent and Opaque Liquids (and Calculation of Dynamic Viscosity)", ASTM Int'l 2009, A00564222, p. 1-10; 11 pgs.

*Primary Examiner* — Duc Truong
(74) *Attorney, Agent, or Firm* — Arent Fox LLP

(57) ABSTRACT

The invention pertains to a process for the addition of at least one (per)fluoropolyether peroxide comprising at least one peroxidic moiety and at least one fluoropolyoxyalkene chain (chain $R_f$) (i.e. a fluorocarbon segment comprising ether linkages in main chain) [peroxide (P)] onto a per(halo)fluorinated aromatic compound [compound (F)], so as to yield an addition compound of said compound (F), said addition compound [compound (A)] comprising at least one perfluorinated non-aromatic cyclic moiety having at least two substituents comprising a chain $R_f$ and, optionally, conjugated or non conjugated double bond(s). Said addition compounds have been notably found useful as additives for (per)fluorinated fluids and lubricants or as base materials for the manufacture of gum and/or graft polymer compositions.

15 Claims, No Drawings

(PER)FLUORINATED ADDITION PRODUCTS

CROSS-REFERENCE TO RELATED APPLICATIONS

The present patent application is a U.S. national stage application under 35 U.S.C. §371 of International Application No. PCT/EP2009/052998 filed Mar. 13, 2009 which claims the benefit of the European patent application No. 08152771.5 filed on Mar. 14, 2008, the whole content of this application being incorporated herein by reference for all purposes.

TECHNICAL FIELD

This invention pertains to a novel process for adding fluorinated peroxides to per(halo)fluorinated aromatic compounds, to addition products therefrom and to the use of said addition products as additives in (per)fluorinated heat exchange fluids and lubricants, as well as raw-materials for manufacture of cured gums and grafted copolymers.

BACKGROUND ART

Reactions of (per)fluorinated peroxides, in particular of (per)fluoroalkanoylperoxides, with organic compounds are well known in the art. Thus, (per)fluorinated peroxides like (per)fluoroalkanoylperoxides have been found to represent suitable tools for the introduction of fluoroalkyl groups into various organic molecules, generally with formation of a carbon-carbon bond.

Direct (per)fluoroalkylation of aromatic substrates, which is generally not achievable via standard methodologies (i.e. Friedel-Craft), can thus be obtained with success through a radical reaction pathway by means of suitable perfluoroalkyl radicals. These synthetic pathways have been recognized to provide with substitution reaction at the aromatic moiety.

It is also known that polyfluorinated aromatic compounds generally undergo addition reactions when reacted with (fluoro)organic radicals. Thus, KOBRINA, L. S. Some perculiarities of radical reactions of polyfluoroaromatic compounds. *J. Fluor. Chem.* 1989, vol. 42, p. 301-344. discloses reaction mechanism and adducts obtained from reactions of free radicals (including fluorinated radicals) onto perfluorobenzene, perfluorotoluene, perfluoronaphtalene.

Similarly, BROOKE, Gerald M. The preparation and properties of polyfluoro aromatic and heteroaromatic compounds. *J. Fluor. Chem.* 1997, vol. 86, p. 1-76. teaches addition reactions of certain organic radicals onto fluoroaromatic compounds.

Nevertheless, these investigations were limited to certain (per)fluoroalkyl or (per)fluoroalkanoylperoxides, and addition compounds thereof onto fluoroaromatic nuclei were merely investigated for mechanistic purposes.

It has now been surprisingly found that the reaction between certain fluorinated peroxides with organic compounds comprising per(halo)fluorinated aromatic moieties yields addition products comprising at least two fluorinated residues which have been notably found useful as additives for (per)fluorinated fluids and lubricants or as base materials for the manufacture of gum and/or graft polymer compositions.

DISCLOSURE OF INVENTION

The invention thus pertains to a process for the addition of at least one (per)fluoropolyether peroxide comprising at least one peroxidic moiety and at least one fluoropolyoxyalkene chain (chain $R_f$) (i.e. a fluorocarbon segment comprising ether linkages in main chain) [peroxide (P)] onto a per(halo)fluorinated aromatic compound [compound (F)], so as to yield an addition compound of said compound (F), said addition compound [compound (A)] comprising at least one perfluorinated non-aromatic cyclic moiety having at least two substituents comprising a chain $R_f$ and, optionally, conjugated or non conjugated double bond(s).

The choice of the per(halo)fluorinated aromatic compound [compound (F)] is not particularly limited, provided that this compound is aromatic and that is per(halo)fluorinated, that is to say that it is free from hydrogen atoms and comprises at least one fluorine atoms.

For the avoidance of doubt, the term "aromatic compound" is hereby intended to denote a cyclic structure having a delocalized conjugated 7 system with a number of 7 delocalized electrons fulfilling the Hückel's rule (number of 7 electrons equal to (4n+2), with n being an integer).

The compound (F) can be monocyclic or polycyclic. It can comprise one or more than one aromatic ring. Should it comprise more than one aromatic ring, these aromatic rings can be condensed or not condensed. The compound (F) can be a heteroaromatic compound, comprising one or more heteroatoms (e.g. O, S, N) in the ring. It can be substituted or not substituted.

Preferably the compound (F) is perfluorinated, that is to say that all its free valences are saturated with fluorine atoms.

Non limitative examples of compounds (F) which are suitable to the purposes of the invention are notably perfluorobenzene, perfluorobiphenyl, perfluoronaphthalene, perfluoroanthracene, perfluoropyridine, perfluorotoluene and derivatives thereof comprising one or more perfluorinated substituent(s).

The expression "at least one peroxide moiety" is understood to mean that the peroxide (P) comprises one or more than one peroxide moiety. Herein below, the expression "peroxide (P)" shall be understood both in the singular and in the plural.

The peroxide moiety of the peroxide (P) can be comprised between $sp^2$ hybridized carbon atoms, e.g. under the form of a diacylperoxide moiety of formula: —C(O)—O—O—C(O)—.

The peroxide moiety of the peroxide (P) is preferably comprised between $sp^3$ hybridized carbon atoms: thanks to this layout, thermal and storage stability of the peroxide (P) is advantageously increased over, notably, that of perfluoroalkanoyl peroxides, wherein the —OO— group is bound to —C(O)— $sp^2$ hybridized carbon atoms.

The fluoropolyoxyalkene chain ($R_f$) of the peroxide (P) is preferably a chain comprising repeating units $R°$, said repeating units being chosen among the group consisting of:

(i) —CFXO—, wherein X is F or $CF_3$,
(ii) —CFXCFXO—, wherein X, equal or different at each occurrence, is F or $CF_3$, with the provision that at least one of X is —F,
(iii) —$CF_2CF_2CF_2O$—,
(iv) —$CF_2CF_2CF_2CF_2O$—,
(v) —$(CF_2)_j$—CFZ—O— wherein j is an integer from 0 to 3 and Z is a group of general formula —$OR'_fT_3$, wherein $R'_f$ is a fluoropolyoxyalkene chain comprising a number of repeating units from 0 to 10, said recurring units being chosen among the followings: —CFXO—, —$CF_2CFXO$—, —$CF_2CF_2CF_2O$—, —$CF_2CF_2CF_2CF_2O$—, with each of X being independently F or $CF_3$. and $T_3$ being a $C_1$-$C_3$ perfluoroalkyl group.

Preferably the peroxide moieties of the peroxide (P) of the invention are randomly distributed in the perfluoropolyoxyalkylene chain.

Thus, the peroxide (P) preferably complies with formula (I) here below:

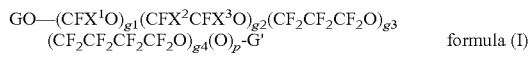

formula (I)

wherein $X^1$, $X^2$, $X^3$ equal or different from each other and at each occurrence are independently —F, —$CF_3$;

G and G', equal to or different from each other, are independently selected from —$CF_3$, —$CF_2$—$CF_3$, —$CF_2Cl$, —$CF_2CF_2Cl$, —$CF_2$—COF, —COF;

g1, g2, g3, and g4, equal or different from each other, are independently integers $\geq 0$, such that the number averaged molecular weight is in the range 220-200 000; should at least two of g1, g2, g3 and g4 be different from zero, the different recurring units are generally statistically distributed along the chain;

p is an integer >0.

Typically the peroxide (P) is chosen such that the ratio p/(g1+g2+g3+g4) is comprised between 0.001 and 0.9, preferably between 0.01 and 0.5.

The peroxidic PFPEs can be prepared, for example, by photo-assisted polymerization of tetrafluoroethylene (TFE) and/or hexafluoropropene (HFP), in the presence of oxygen according to the teachings of U.S. Pat. No. 3,442,942 (MONTEDISON SPA) 6 May 1969 U.S. Pat. No. 3,650,928 (MONTEDISON SPA) 21 Mar. 1972 U.S. Pat. No. 3,665,041 (MONTEDISON SPA) 23 May 1972.

The peroxidic PFPEs containing the units —($CF_2$)— CFZ—O— can be prepared, for example, according to what described in U.S. Pat. No. 5,144,092 by polymerization, in the presence of oxygen and UV, of one or more (per)fluoroalkylvinylethers of formula $CF_2$=CFOXa wherein Xa is one or more groups (R'O)$_m$R", equal to or different from each other, wherein m=0-6, R' is selected from the groups —$CF_2$—, —$CF_2CF_2$—, —$CF_2CF(CF_3)$—, R" is selected from $C_1$-$C_{10}$ linear perfluoroalkyl, or $C_3$-$C_{10}$ branched perfluoroalkyl, or $C_3$-$C_{10}$ cyclic perfluoroalkyl, by operating in the presence of solvent and at a temperature not higher than 50° C. This same process can be carried out also in the presence of TFE and/or HFP. See furthermore, for example, EP 1454938 A (SOLVAY SOLEXIS SPA) 8 Aug. 2004, EP 1524287 A (SOLVAY SOLEXIS SPA) 20 Apr. 2005.

Preferably the peroxide (P) is selected from the following classes:

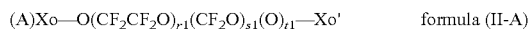

formula (II-A)

wherein

Xo and Xo', equal to or different from each other, are —$CF_2Cl$, —$CF_2CF_2Cl$, —$CF_3$, —$CF_2CF_3$, —$CF_2COF$, —COF;

r1, s1, t1 are integers $\geq 0$ such that the number average molecular weight is between 400 and 150,000, preferably between 500 and 80 000; t1 is an integer >0; both r1 and s1 are preferably different from zero, with the ratio r1/s1 being preferably comprised between 0.1 and 10.

Peroxides (P) complying with formula (IIA) here above can be prepared by tetrafluoroethylene oxypolymerization notably following the teachings of U.S. Pat. No. 3,715,378 (MONTEDISON SPA) 6 Feb. 1973, U.S. Pat. No. 4,451,646 (MONTEDISON SPA) 29 May 1984, U.S. Pat. No. 5,258,110 (AUSIMONT SRL) 2 Nov. 1993, U.S. Pat. No. 5,744,651 (AUSIMONT SPA) 28 Apr. 1998.

formula (II-B)

wherein:

X3 and X3', equal to or different from each other, are —$CF_2Cl$, —$CF_2CF_2Cl$, —$CF_2CF_3$, —$CF_3$, —$C_3F_7$, —CF($CF_3$)COF, —COF, —$CF_2COF$, —$CF_2C(O)CF_3$;

r2, s2, u2, v2 are integers $\geq 0$, chosen so that the number average molecular weight is between 500 and 150 000, preferably between 700 and 80 000; t2 is an integer >0. Preferably r2, s2, u2, v2 are all >0, with the ratio v2/(r2+s2+u2) being <1.

Peroxides (P) complying with formula (II-B) here above can be prepared by oxypolymerization of tetrafluoroethylene and hexafluoropropylene notably following the teachings of U.S. Pat. No. 5,000,830 (AUSIMONT SRL) 19 Mar. 1991, and U.S. Pat. No. 3,847,978 (MONTEDISON SPA) 12 Nov. 1974;

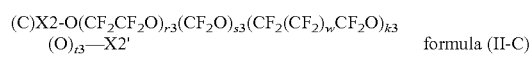

formula (II-C)

wherein:

X2 and X2', equal to or different from each other, are —$CF_2COF$, —COF;

w=1 or 2;

r3, s3, and k3 are integers $\geq 0$ chosen so that the number average molecular weight is between 500 and 100,000 and t3 is an integer >0; preferably r3, s3 and k3 are all >0, with the ratio r3/s3 being typically between 0.2 and 10, and the ratio k3/(r3+s3) being generally lower than 0.05.

Peroxides (P) complying with formula (II-C) above can be prepared following teachings of US 2005192413 (SOLVAY SOLEXIS SPA) 1 Sep. 2005.

More preferably, peroxide (P) complies with formula (III) here below:

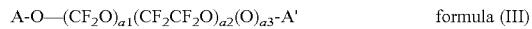

formula (III)

wherein:

A and A', equal or different from each other and at each occurrence are independently selected from —$CF_3$, —$CF_2$—$CF_3$, —$CF_2Cl$, —$CF_2CF_2Cl$, —$CF_2$—COF; —COF;

a1, a2 and a3 are integers >0 such that the number average molecular weight is between 400 and 150,000, preferably between 500 and 80 000, with the ratio a2/a1 being comprised between 0.1 and 10, more preferably between 0.2 and 5; preferably the ratio a3/(a1+a2) is comprised between 0.01 and 0.5, more preferably between 0.03 and 0.3.

The process of the invention can be carried out in the presence of suitable solvents, wherein the compound (F) can be solubilized. These solvents are advantageously chosen among those which do not react with the peroxide (P). Among suitable solvents mention can be notably made of (per)fluorocarbons, (per)chlorofluorocarbons, (per)(halo)fluoroalkylethers, tertiary (per)fluoroalkylamines, (per)fluoropolyethers, liquefied gases like supercritical $CO_2$.

Otherwise, the process can be carried out in the absence of any solvent, the compound (F) advantageously providing a suitable liquid reaction medium for the addition reaction.

Contact time between compound (F) and peroxide (P) is not particularly limited and will be chosen by the skilled in the art in relation, notably, with the reaction temperature; contact time can vary between a few seconds and several hours; it is nevertheless understood that this contact time is generally comprised between 15 minutes and 50 hours, preferably between 30 minutes and 30 hours.

It is also generally preferred to contact compound (F) and peroxide (P) under inert atmosphere, i.e. under an atmosphere substantially free from oxygen. Typically, compound (F) and peroxide (P) are contacted in the presence of an inert gas, like notably nitrogen, argon, helium, gaseous fluorocarbons, gaseous hydrofluorocarbon, gaseous (per)(hydro)fluoroethers (e.g. $CF_4$, $CF_3CH_2F$, $HCF_2OCF_2CF_3$, $CF_3OCF_2CF_3$) or, as an alternative, under reduced pressure.

The compound (F) while in contact with peroxide (P) can be heated at a temperature comprised between $-60°$ C. and $350°$ C.

Should the peroxide (P) decompose to generated radicals under the effect of the temperature, then appropriate temperature will be selected by the skilled in the art with reference to the decomposition temperature of said peroxide (P). Preferably, temperatures suitable for achieving efficient thermal decomposition of peroxide (P) and thus radical reaction with the compound (F) are those comprised between 100 and $300°$ C., more preferably between 120 and $250°$ C.

As an alternative, decomposition of peroxide (P) for yielding radicals can be effected via photochemical reaction, using appropriate wavelength radiation (generally U.V. radiation); in this case, reaction temperature will not be particularly limited by the decomposition temperature of said peroxide (P). Generally, this temperature will be comprised between $-60°$ C. and $100°$ C.

Molar ratio between equivalents of peroxidic moieties of peroxide (P) and equivalents of compound (F) is not particularly limited. In order to limit further reaction on the same cyclic moiety, or in other words, the formation of crosslinked structures, it is generally preferred reacting peroxide (P) with an excess of equivalents of compound (F).

Another object of the invention is a compound [compound (A)] comprising at least one per(halo)fluorinated non-aromatic cyclic moiety having chemically bound to at least two $sp^3$ hybridized carbon atoms a fluoropolyoxyalkene chain ($R_f$) as above described, and, optionally, conjugated or non conjugated double bond(s).

Said materials can be obtained by the process of the invention.

Compounds (A) according to certain embodiments of the invention comprise at least one double bond in said per(halo)fluorinated non-aromatic cyclic moiety. Said conjugated or non-conjugated double bond can be advantageously used for further reacting compound (A) in certain fields of application.

The compound (A) advantageously complies with formula here below,

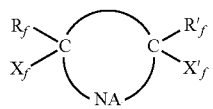

wherein:
  $R_f$ and $R'_f$, equal or different from each other are fluoropolyoxyalkylene chains bound to a $sp^3$ hybridized carbon atom either via an ether linkage or a C—C bond, optionally bound at their distal end group to another $sp^3$ hybridized carbon atom of a further NA moiety;
  $X_f$ and $X'_f$, equal or different from each other are chosen among halogen, and $C_1$-$C_{12}$ per(halo)fluorocarbon substituents, preferably among —F and $C_1$-$C_{12}$ perfluoroalkyl or perfluoroaryl groups;
  NA represents a per(halo)fluorinated non-aromatic cyclic moiety [moiety (NA)] optionally condensed with additional aromatic or non aromatic moieties, optionally having one or more conjugated or non conjugated double bond(s), optionally having one or more per(halo)fluorosubstituents and wherein said cyclic moiety comprises the two $sp^3$ hybridized carbon bearing $R_f$ and $R'_f$ substituents.

Non limitative examples of structures encompassed by general formula of compound (A) as above detailed are notably the followings:

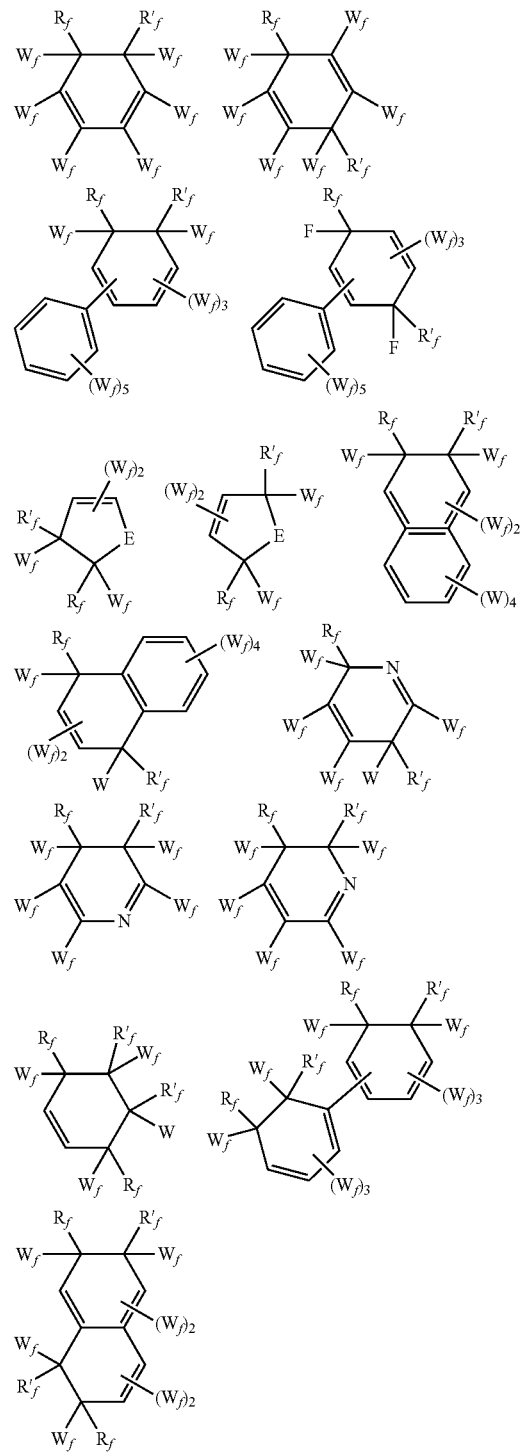

wherein $R_f$, $R'_f$ have the same meaning as above defined and $W_f$ is a fluorine atom or a $C_1$-$C_6$ perfluorocarbon group.

The compound (A) preferably comprises chemically bound to sp³ hybridized carbon atoms fluoropolyoxyalkylene chains ($R_f$, $R'_f$) of formula:

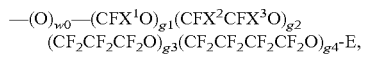
$(CF_2CF_2CF_2O)_{g3}(CF_2CF_2CF_2CF_2O)_{g4}$-E, wherein:
w0 is zero or 1;
X1, X2, X3, g1, g2, g3, g4 have the same meaning as above defined;
E is a group selected from —$CF_3$, —$CF_2$—$CF_3$, —$CF_2Cl$, —$CF_2CF_2Cl$, —COF,
$CF_2$—COF, —$CF_2OCOF$, or is a group bonding directly or through an ether linkage another sp³ hybridized carbon atom of a per(halo)fluorinated non-aromatic cyclic moiety.

The Applicant thinks, without this limiting the scope of the invention, that when peroxide (P) and compound (F) are reacted in the presence of a solvent, the fluoropolyoxyalkylene chains in addition product (compound (A)) are mainly bound to the sp³ hybridized carbon atoms via a carbon-carbon covalent bond, that is to say that in above depicted formula, w0 is zero. This behaviour is considered to be a consequence of the relative instability of oxygen radicals on fluoropolyoxyalkylene chains in these conditions, so that a carbon radical is generally formed by evolution of $COF_2$ before the radical species can react with the starting compound (F).

Compounds (A) wherein the fluoropolyoxyalkylene chains are bound through an oxygen atom (w0=1), which are still encompassed by the scope of present invention, are considered as generally prevailing when the reaction between compound (F) and peroxide (P) is carried out in the absence of a solvent.

As the fluoropolyoxyalkylene can be bound at its distal end group to another sp³ hybridized carbon atom of a further moiety (NA), the compound (A) can be advatangeously under the form of a block copolymer having fluoropolyoxyalkylene chains interconnected via moieties (NA), as shown, e.g. in the following scheme:

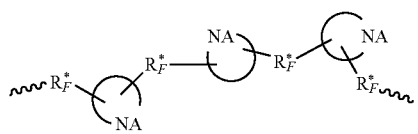

wherein $R^*_F$ is a divalent fluoropolyoxyalkylene chain and NA has the same meaning as above defined.

Should the compound (A) comprise fluoropolyoxyalkylene chains as above described having end groups of formulae —COF, —$CF_2$—COF, and/or —$CF_2$ OCOF, said compound (A) can be submitted to further treatments so as to increase stability of said groups and obtain a compound (A') free from fluoroacyl groups.

Thus, compound (A) can be submitted to fluorination (e.g. with elemental fluorine) for transforming said end-chains in perfluoroalkyl end groups, so as to obtain a stabilized compound ($A'_f$) wherein the end-group of the fluoropolyoxyalkylene chains are chosen among: —$CF_3$, —$CF_2$—$CF_3$, —$CF_2Cl$, —$CF_2CF_2Cl$. Should the non-aromatic cyclic moiety (NA) of the compound (A) comprise one or more conjugated or non-conjugated double bond(s), at least a part of these unsaturations typically undergo fluorine addition in fluorination conditions. Fluorination would not thus the preferred stabilization procedure, wherein further reactivity of above mentioned double bonds is to be used for manufacture compound (A) derivatives.

Still, compound (A) can be submitted to thermal decarboxylation either after preliminary hydrolysis and conversion of —COF moieties in corresponding metal carboxylates, or in the presence of a base, as to obtain a stabilized compound ($A'_d$).

Otherwise, compound (A) can be submitted to esterification process by reaction with a suitable alcohol for transforming said end-chains in corresponding ester end groups, so as to obtain a stabilized compound ($A'_e$) wherein the end-groups of the fluoropolyoxyalkylene chains are chosen among: —$CF_3$, —$CF_2$—$CF_3$, —$CF_2Cl$, —$CF_2CF_2Cl$, —$C(O)OR_{H,F}$, —$CF_2$—$C(O)OR_{H,F}$, wherein $R_{H,F}$ is a $C_1$-$C_6$ hydrocarbon group, optionally fluorinated or perfluorinated.

The compound (A) can be notably used as additive in (per)fluorinated heat exchange fluids and/or in lubricants.

The compound (A) used in above mentioned compositions, in combination with (per)fluorinated heat exchange fluids (e.g. fluorinated ether fluids) and/or (per)fluorinated lubricants (e.g. PFPE lubricants) is preferably free from fluoroacyl groups (—COF) and can be under the form of compound ($A'_f$), ($A'_d$) or ($A'_e$).

It is thus another object of the invention a composition comprising the compound (A) as above described and at least one fluorinated ether fluid free from functional groups [fluid (H)].

The expression "at least one fluorinated ether fluid" is meant to encompass composition comprising one or more than one (i.e. mixtures) fluid (H). In the rest of the text, the term fluid (H) shall be understood both in the singular and in the plural, so as to designate one or more than one fluid (H).

The fluid (H) of the invention is a chemical compound comprising carbon, fluorine, and one or more ether oxygen atoms. The fluid (H) can be straight-chained, branched-chained, or cyclic, or a combination thereof, such as alkylcycloaliphatic. Optionally fluid (H) can comprise hydrogen atoms and/or halogen atoms.

The fluorinated ether fluid free from functional groups [fluid (H)] preferably complies with formula (I A) or (I B) here below:

 (I A)

 (I B)

wherein:
$R^{H'}$ and $R^H$, equal or different from each other, are independently chosen among —$C_mF_{2m+1}$, —$C_nF_{2n+1-h}H_h$, —$C_p$—$F_{2p+1-h'}X_{h'}$, —$C_zF_{2z}OC_yF_{2y+1}$, —$C_uF_{2u-u'}H_{u'}OC_wF_{2w+1-w'}H_{w'}$ groups, with n, m, p, z, y, u, w being integers from 1 to 8, preferably from 1 to 7, h, h', u' and w' being integers ≧1, chosen so that h≦2n+1, h'≦2p+1, u'≦2u, w'≦2w+1, X being a halogen atom chosen among Cl, Br, I (preferably a chlorine atom);
$R^H_f$ is a fluoropolyoxyalkene chain comprising repeating units $R^{Ho}$, said repeating units being chosen among the group consisting of:
(i) —CFXO—, wherein X is F or $CF_3$,
(ii) —$CF_2CFXO$—, wherein X is F or $CF_3$,
(iii) —$CFXCF_2O$—, wherein X is F or $CF_3$,
(iv) —$CF_2CF_2CF_2O$—,
(v) —$CF_2CF_2CF_2CF_2O$—;
r is equal to zero or 1, preferably r being 1;
J is a divalent hydrocarbon radical having 1 to 12 carbon atoms, linear or branched, aliphatic or aromatic, preferably an aliphatic divalent hydrocarbon group having 1 to 6 carbon atoms, e.g. —$CH_2$—, —$CH_2CH_2$— or —$CH(CH_3)$—;

j is equal to zero or 1.

In the fluid (H), $R^H_f$ is preferably chosen among the followings:

1) —$(CF_2O)_a$—$(CF_2CF_2O)_b$—, with a and b being integers up to 100, a≧0, b≧0 and a+b>0; preferably, each of a and b being >0, and b/a being comprised between 0.1 and 10;

2) —$(CF_2$—$(CF_2)_{z'}$—$CF_2O)_{b'}$—, wherein z' is an integer equal to 1 or 2; b' being an integer up to 100;

3) —$(C_3F_6O)_c$—$(C_2F_4O)_b$—$(CFL_OO)_t$—, with $L_O$, being, at each occurrence independently selected among —F and —$CF_3$; b, t, and c being integers up to 100, c>0, b≧0, t≧0; preferably, b and t>0, c/b being comprised between 0.2 and 5.0 and (c+b)/t being comprised between 5 and 50;

4) —$(CF_2O)_a$—$(CF_2CF_2O)_b$—$(CF_2$—$(CF_2)_{z'}$—$CF_2O)_{b'}$—, with a≧0, b'≧0 and 0<a+b+b'<100; z' is an integer equal to 1 or 2.

The fluid (H) of the invention can be a hydrofluoroether [fluid (HFE)], i.e. a compound comprising, in addition to carbon, fluorine, and ether oxygen atom(s), one or more hydrogen atoms.

Fluids (HFE) are particularly preferred in view of their outstanding combination of good heat transfer performances over a wide liquid temperature range along with optimum safety (non-flammability and low toxicity) and environmental (low-ozone depleting and low global warming) properties.

Fluid (HFE) preferably complies with formula (IIA) or (IIB) here below:

$$R^{H*'}O—(R^H_f)_r—R^{H*} \quad (IIA)$$

$$R^{H*'}O-J-(O)_j—R^{H*} \quad (IIB)$$

wherein:

$R^{H*'}$ and $R^{H*}$, equal or different from each other, are independently chosen among —$C_mF_{2m+1}$, —$C_nF_{2n+1-h}H_h$, —$C_zF_{2z}OC_yF_{2y+1}$, —$C_uF_{2u-u'}F_{2u-u'}H_{u'}OC_wF_{2w+1-w'}H_{w'}$ groups, with n, m, z, y, u, w being integers from 1 to 8, preferably from 1 to 7, h, u' and w' being integers ≧1, chosen so that h≦2n+1, u'≦2u, w'≦2w+1, with the provision that at least one of and $R^{H*'}$ and $R^{H*}$ in formula (IIA) is a —$C_nF_{2n+1-h}H_h$ group or a —$C_uF_{2u-u'}H_{u'}OC_wF_{2w+1-w'}H_{w'}$ group, as above defined;

$R^H_f$, J, j and r have the same meaning as above defined.

More preferably, fluid (HFE) complies with formula (IIA) here above.

The Applicant has surprisingly found that the addition of compound (A) to said fluorinated ether fluid [fluid (H)] improves notably performances of the composition in vapour phase or condensation heating (including vapour phase soldering), including no chemical reactivity, excellent dielectric properties, and substantial absence of condensation residue on heated parts.

Still another object of the invention is a composition comprising the compound (A) as above described and at least one lubricant.

Preferably, said composition comprises at least one (i.e. one or a mixture of more than one) perfluoropolyether (PFPE) lubricant, i.e. a lubricant comprising a perfluorooxyalkylene chain, that is to say a chain comprising recurring units having at least one ether bond and at least one fluorocarbon moiety.

PFPE lubricants can be classified in oils and greases; it is generally understood that oils are compounds having kinematic viscosity (ASTM D445) at 20° C. of from 30 to 30 000 cSt; greases are derived from such oils by addition of suitable thickeners, such as notably polytetrafluoroethylene (PTFE) or inorganic compounds, e.g. talc.

More preferably, the composition comprises a lubricant comprising at least one oil selected from the following groups:

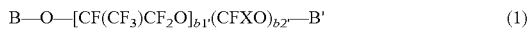

B—O—[$CF(CF_3)CF_2O$]$_{b1'}$($CFXO$)$_{b2'}$—B'  (1)

wherein:
X is equal to —F or —$CF_3$;
B and B', equal to or different from each other, are selected from —$CF_3$, —$C_2F_5$ or —$C_3F_7$;
b1' and b2', equal or different from each other, are independently integers ≧0 selected such that the b1'/b2' ratio is comprised between 20 and 1,000 and b1'+b2' is in the range 5 to 250; should b1' and b2' be both different from zero, the different recurring units are generally statistically distributed along the chain.

Said products can be obtained by photooxidation of the hexafluoropropylene as described in CA 786877 (MONTEDISON SPA) 6 Apr. 1968, and by subsequent conversion of the end groups as described in GB 1226566 (MONTECATINI EDISON SPA) 31 Mar. 1971.

$$C_3F_7O—[CF(CF_3)CF_2O]_{o'}-D \quad (2)$$

wherein
D is equal to —$C_2F_5$ or —$C_3F_7$;
o' is an integer from 5 to 250.

Said products can be prepared by ionic hexafluoropropylene epoxide oligomerization and subsequent treatment with fluorine as described in U.S. Pat. No. 3,242,218 (DU PONT) 22 Mar. 1966.

$$\{C_3F_7O—[CF(CF_3)CF_2O]_{dd'}—CF(CF_3)—\}_2 \quad (3)$$

wherein
dd' is an integer between 2 and 250.

Said products can be obtained by ionic telomerization of the hexafluoropropylene epoxide and subsequent photochemical dimerization as reported in U.S. Pat. No. 3,214,478 (DU PONT) 26 Oct. 1965.

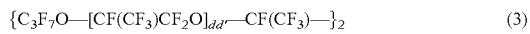

C'—O—[$CF(CF_3)CF_2O$]$_{c1'}$($C_2F_4O$)$_{c2'}$($CFX$)$_{c3'}$—C''  (4)

wherein
X is equal to —F or —$CF_3$;
C' and C'', equal to or different from each other, are selected from —$CF_3$,
$C_2F_5$ or —$C_3F_7$;
c1', c2' and c3' equal or different from each other, are independently integers ≧0, such that and c1'+c2'+c3' is in the range 5 to 250; should at least two of c1', c2' and c3' be different from zero, the different recurring units are generally statistically distributed along the chain.

Said products can be manufactured by photooxidation of a mixture of $C_3F_6$ and $C_2F_4$ and subsequent treatment with fluorine as described in U.S. Pat. No. 3,665,041 (MONTEDISON SPA) 23 May 1972.

D-O—($CF_2O$)$_{d1'}$($CF_2CF_2O$)$_{d2'}$($CF_2CF_2CF_2O$)$_{d3'}$($CF_2CF_2CF_2CF_2O$)$_{d4'}$-D'  (5)

wherein
D and D', equal to or different from each other, are selected from —$CF_3$, —$C_2F_5$ or —$C_3F_7$;
d1', d2', d3', d4' equal or different from each other, are independently integers ≧0, such that d1'+d2'+d3'+d4' is in the range 5 to 250 and the d2'/d1' ratio is comprised between 0.1 and 5; should at least one of d1 to d4' be both different from zero, the different recurring units are generally statistically distributed along the chain.

Said products can be produced by photooxidation of $C_2F_4$ as reported in U.S. Pat. No. 3,715,378 (MONTEDISON SPA) 6 Feb. 1973 and subsequent treatment with fluorine as described in U.S. Pat. No. 3,665,041 (MONTEDISON SPA) 23 May 1972.

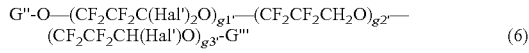  (6)

wherein
- G" and G''', equal to or different from each other, are selected from —$CF_3$, —$C_2F_5$ or —$C_3F_7$;
- Hal', equal or different at each occurrence, is a halogen chosen among F and Cl, preferably F;
- g1', g2', and g'3 equal or different from each other, are independently integers $\geq 0$, such that g1'+g2'+g3' is in the range 5 to 250; should at least two of g1', g2' and g3' be different from zero, the different recurring units are generally statistically distributed along the chain.

Said products may be prepared by ring-opening polymerizing 2,2,3,3-tetrafluorooxethane in the presence of a polymerization initiator to give a polyether comprising repeating units of the formula: —$CH_2CF_2CF_2O$—, and optionally fluorinating and/or chlorinating said polyether, as detailed in EP 148482 A (DAIKIN INDUSTRIES) 17 Jul. 1985.

$$L-O-(CF_2CF_2O)_{l'}-L' \quad (7)$$

wherein
- L and L', equal to or different from each other, are selected from —$C_2F_5$ or —$C_3F_7$;
- l' is an integer in the range 5 to 250.

Said products can be obtained by a method comprising fluorinating a polyethyleneoxide, e.g. with elemental fluorine, and optionally thermally fragmentating the so-obtained fluorinated polyethyleneoxide as reported in U.S. Pat. No. 4,523,039 (THE UNIVERSITY OF TEXAS) 11 Jun. 1985.

  (8)

wherein
- $R^1_f$ is a perfluoroalkyl group having from 1 to 6 carbon atoms;
- $R^2_f$ is equal to —F or perfluoroalkyl group having from 1 to 6 carbon atoms;
- kk1' is an integer from 1 to 2;
- kk2' represents a number in the range 5 to 250.

Said products can be produced by the copolymerization of hexafluoroacetone with an oxygen-containing cyclic comonomer selected from ethylene oxide, propylene oxide, epoxy-butane and/or trimethylene oxide (oxethane) or substituted derivatives thereof and subsequent perfluorination of the resulting copolymer, as detailed in patent application WO 87/00538 (LAGOW ET AL.) 29 Jan. 1987.

Preferred lubricants suitable for the purposes of the invention are notably:
- those commercially available under the trade name FOMBLIN® (type Y, M, W, or Z) from Solvay Solexis, S.p.A.; lubricants of this family generally comprise at least one oil (i.e. only one or mixture of more than one oil) complying with either of formulae here below:

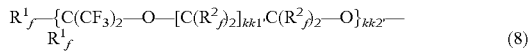

m + n = 8-45; m/n = 20-10000

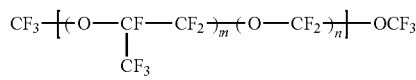

p + q = 40-180; p/q = 0.1-10

- those commercially available under the trade name KRYTOX® from Du Pont de Nemours, said lubricants generally comprising at least one (i.e. one or mixtures of more than one) low-molecular weight, fluorine end-capped, homopolymer of hexafluoropropylene epoxide with the following chemical structure:

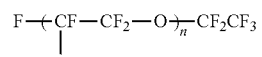

n = 10 to 60

- those commercially available under the trade name DEMNUM® from Daikin, said lubricants generally comprising at least one (i.e. one or mixture of more than one) oil complying with formula:

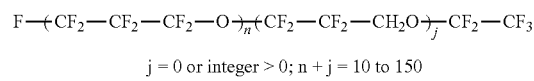

j = 0 or integer > 0; n + j = 10 to 150

More preferred lubricants are those commercially available under the trade name FOMBLIN®, as above detailed.

The composition generally comprises the compound (A) in an amount of from 0.1 to 10% wt, preferably from 0.2 to 8% wt, more preferably from 0.5 to 5% wt with respect to the total weight of the composition.

The Applicant has surprisingly found that the addition of compound (A) to said (per)fluorinated lubricant improves notably performances of the composition in tribological application, including improved anti-rust properties and thermal stability, especially in extreme conditions.

The Applicant has also found that the compound (A) can be used for the manufacture of cured gums, by e.g. compounding with suitable curing agent.

The composition comprising compound (A) and the curing agent can then be fabricated notably by moulding (e.g. injection moulding, extrusion moulding), calendering, or extrusion into the desired shaped article, which is advantageously subjected to vulcanization (curing) during the processing itself and/or in a subsequent step (post-treatment or post-cure), advantageously transforming the relatively soft, weak, compound (A) (generally available as highly viscous liquid) into a finished article made of non-tacky, strong, insoluble, chemically and thermally resistant cured composition.

Cured gum obtainable from compound (A) is notably endowed with outstanding low temperature properties, thanks to its very low glass transition temperature.

It is thus a further object of the invention a curable composition comprising compound (A) as above detailed and a curing agent.

Typically, the compound (A) used in the curable composition has one or more conjugated or non conjugated double bond(s) in at least one of its non-aromatic cyclic moieties (NA).

The choice of the curing agent is not particularly restricted, provided that said agent is capable of generating radicals by thermal decomposition. Among most commonly used agents, mention can be made of: dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl]carbonate, and peroxides (P) as above detailed.

Other ingredients which can be notably added to the curable composition are:
(a) curing coagents, in amounts generally of between 0.5% and 10% and preferably between 1% and 7% by weight relative to the polymer; among these agents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane; bis-olefins, as notably described in European patent application EP 769520 A (AUSIMONT SPA) 20 Oct. 1995; triazines described in European patent applications EP 860 436 and WO 97/05122; TAIC being particularly preferred;
(d) other conventional additives, such as fillers, thickeners, pigmen-ts, antioxidants, stabilizers, processing aids, and the like.

Further, the Applicant has found that the compound (A) can be used for the manufacture of grafted copolymers comprising a polymer matrix and compound (A) moieties grafted thereto.

Preferably, the compound (A) used for grafting has one or more conjugated or non conjugated double bond(s) in at least one of its non-aromatic cyclic moieties (NA).

The choice of the polymer matrix is not particularly limited; hydrogenated or fluorinated polymers obtained by poly-addition, or polycondensation reactions can be used. Non (imitative examples are notably halogenated vinyl polymers (e.g. PVC, PVDC, PVDF . . . ), (meth)acrylic polymers, styrene polymers and the like.

The grafted copolymer, which is a further object of the invention, can be notably manufactured by copolymerizing compound (A) having at least one double bond in at least one of its non-aromatic cyclic moieties (NA) with an ethylenically unsaturated monomer, in the presence of a suitable radical initiator.

Otherwise, grafted copolymer can be obtained by reacting compound (A) having at least one double bond in at least one of its non-aromatic cyclic moieties (NA) with a polymer matrix, said polymer matrix being submitted to preliminary activation (e.g. by reaction with radical initiators, by irradiation, by functionalization).

The invention will be now explained in more detail with reference to the following examples whose purpose is merely illustrative and not intended to limit the scope of the invention.

EXAMPLE 1

Addition of a Perfluoropolyether Peroxide (Mn=39.000) Having P.O.=1.3 on Hexafluorobenzene 1a) Addition Reaction In a stainless steel reactor having an inner volume of 1000 ml, a liquid mixture comprising 700 g of hexafluorobenzene (commercially available from Aldrich) and 70 g of a PFPE peroxide of formula:

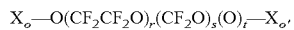

wherein $X_o$ e $X_{o'}$ are: $-CF_3$ (31%), $-CF_2Cl$ (16%), $-CF_2CF_2Cl$ (4%), $-COF$ (12%), $-CF_2COF$ (37%), r/s=1.05 e t/(r+s)=0.074 and having a number averaged molecular weight of $3.9*10^4$ and having a P.O. of 1.3. P.O. or oxydizing power was determined as described in U.S. Pat. No. 7,329,784 (SOLVAY SOLEXIS) 12 Feb. 2008.

After three cycles of freeze-thawing under nitrogen, the autoclave was heated at 240° C. for 3 hours; after this reaction time, a maximum pressure of 30 bar was achieved.

The autoclave was then cooled to room temperature and over-pressure (3 bar) of carbonyl fluoride was vented. Unreacted hexafluorobenzene was separated by fractional distillation, first at atmospheric pressure, then under vacuum ($P=10^{-1}$ mbar, T max=200° C.) until recovery of 680 gr. Oily distillation residue (71 g) was characterized by NMR spectroscopy and was found to comply to the following structure:

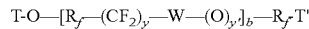

wherein
W are divalent perfluoro-1,3-cyclohexadienic units and perfluoro-1,4-cyclohexadienic units of formula $-C_6F_6-$
y, y'=0 or 1
$R_f$ are perfluoropolyether blocks of formula;

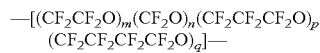

with m/n=0.94, p/n=0.009 and q/n=0.002
b=16
$M_n=3.0\times10^4$
T and T' are: $-CF_3$ (24%), $-CF_2Cl$ (12%), $-CF_2CF_2Cl$ (3), $-CF_2COF$ (61%).

The presence of cyclohexadienic structure was confirmed by IR analysis which evidenced absorption peaks centered at 1768, 1733 and 1706 cm$^{-1}$, which are related to stretching modes of C=C double bond.

1b) Esterification of Terminal Acyl Fluoride End-Groups

In a glass reactor having inner volume of 125 ml, 60 g of the addition product obtained in example 1 was combined with 60 g of isobutanol. The so-obtained mixture was heated at reflux for 4 hours. Then, the reaction mixture was submitted to fractionation, first at atmospheric pressure, then under vacuum (10$^{-1}$ mbar) until complete elimination of unreacted isobutanol. IR analysis of the vacuum residue (60 g) evidenced the quantitative conversion of acyl fluoride end-groups (having absorption band at 1784 cm$^{-1}$) into ester moieties having absorption band at 1794 cm$^{-1}$).

EXAMPLE 2

Addition of a Perfluoropolyether Peroxide (Mn=30.000) Having P.O.=0.49 on Decafluorobiphenyl 2a) Addition Reaction Same procedure as detailed in example 1 was repeated, but using decafluorobiphenyl (70 gr) instead of hexafluorobenzene and the PFPE peroxide of formula:

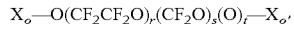

wherein $X_o$ e $X_{o'}$ are: $-CF_3$ (38%), $-CF_2Cl$ (17%), $-CF_2CF_2Cl$ (4), $-COF$ (12%), $-CF_2COF$ (29%), having a number averaged molecular weight of $3.0*10^4$, r/s=0.96, t/(r+s)=0.028 and a P.O. of 0.49.

Unreacted decafluorobiphenyl (280 gr) was recovered by distillative fractionation as detailed in example 1. Oily distillation residue (73 g) was characterized by NMR spectroscopy and was found to comply to the following structure:

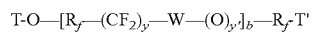

wherein
W are divalent cyclohexadienic units of formula —$C_6F_5Z$—, with Z being a perfluorophenyl group,
y, y'=0 or 1
$R_f$ are perfluoropolyether blocks of formula:

—[(CF$_2$CF$_2$O)$_m$(CF$_2$O)$_n$(CF$_2$CF$_2$O)$_p$(CF$_2$CF$_2$CF$_2$CF$_2$O)$_q$]— with m/n=1.05, p/n=0.008 and q/n=0.003
b=5
$M_n$=2.5×10$^4$
T and T' are: —CF$_3$ (26%), —CF$_2$Cl (12%), —CF$_2$CF$_2$Cl (3), —CF$_2$COF (59%).

The presence of cyclohexadienic structure was confirmed by IR analysis which evidenced absorption peaks centred at 1765, 1739 and 1706 cm$^{-1}$, which are related to stretching modes of C═C double bond. The presence of perfluorophenyl rings is confirmed by $^{19}$F-NMR, wherein signals at 135, 150 and 161 ppm (CFCl$_3$ reference), due, respectively, to fluorine atoms in ortho, para and meta in the perfluorophenyl ring.

2 b) Esterification of Terminal Acyl Fluoride End-Groups

Addition product obtained as above detailed was esterified following procedure described in example 1b), and quantitative conversion of acyl fluoride groups into isobutyl esters group was confirmed by IR spectroscopy.

EXAMPLE 3

Addition of a Perfluoropolyether Peroxide (Mn=39.000) Having P.O.=1.3 on Decafluorobiphenyl 3a) Addition Reaction Same procedure of example 1 was repeated, using decafluorobiphenyl (70 gr) instead of hexafluorobenzene but same PFPE peroxide as in example 1. Unreacted decafluorobiphenyl (276 gr) was recovered by distillation. An oily residue (77 g) was recovered, which was found to comply with the following structure:

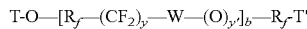
T-O—[$R_f$—(CF$_2$)$_y$—W—(O)$_{y'}$]$_b$—$R_f$-T' wherein
W are divalent perfluoro-phenyl-1,3-cyclohexadienic units and perfluoro-phenyl-1,4-cyclohexadienic units of formula —$C_6F_5Z$—, with Z being a perfluorophenyl group,
y, y'=0 or 1
$R_f$ are perfluoropolyether blocks of formula:

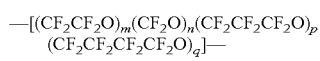
—[(CF$_2$CF$_2$O)$_m$(CF$_2$O)$_n$(CF$_2$CF$_2$O)$_p$(CF$_2$CF$_2$CF$_2$CF$_2$O)$_q$]— with m/n=0.96, p/n=0.008 and q/n=0.004
b=15
$M_n$=3.1×10$^4$
T and T' are: —CF$_3$ (25%), —CF$_2$Cl (11%), —CF$_2$CF$_2$Cl (4%), —CF$_2$COF (60%).

3 b) Esterification of Terminal Acyl Fluoride End-Groups

Addition product obtained as above detailed was esterified following procedure described in example 1b), and quantitative conversion of acyl fluoride groups into isobutyl esters group was confirmed by IR spectroscopy.

EXAMPLE 4

Addition of a Perfluoropolyether Peroxide (Mn=30.000) Having P.O.=0.49 on Hexafluorobenzene 4a) Addition Reaction Same procedure of example 2 was repeated but using hexafluorobenzene rather than decafluorobiphenyl.
After removal of 682 gr of unreacted hexafluorobenzene, 71 gr of an oily residue were isolated, complying with following structure:

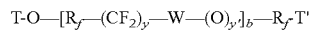
T-O—[$R_f$—(CF$_2$)$_y$—W—(O)$_{y'}$]$_b$—$R_f$-T' wherein
W are divalent perfluoro-1,3-cyclohexadienic units and perfluoro-1,4-cyclohexadienic units of formula —$C_6F_6$—,
y, y'=0 or 1
$R_f$ are perfluoropolyether blocks of formula:

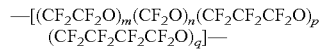
—[(CF$_2$CF$_2$O)$_m$(CF$_2$O)$_n$(CF$_2$CF$_2$O)$_p$(CF$_2$CF$_2$CF$_2$CF$_2$O)$_q$]— with m/n=0.93, p/n=0.008 and q/n=0.005
b=6
$M_n$=2,4×10$^4$
T and T' are: —CF$_3$ (28%), —CF$_2$Cl (13%), —CF$_2$CF$_2$Cl (3%), —CF$_2$COF (56%).

4 b) Esterification of Terminal Acyl Fluoride End-Groups

Addition product obtained as above detailed was transformed in corresponding ester following procedure described in example 1b), and quantitative conversion of acyl fluoride groups into isobutyl esters group was confirmed by IR spectroscopy.

EXAMPLE 5

Addition of a Perfluoropolyether Peroxide (Mn=30.000) Having P.O.=0.49 on Perfluorotoluene 5a) Addition Reaction Same procedure of example 2a) was followed, but using 15 g of perfluorotoluene and 3.0 g of the PFPE peroxide. After recover of unreacted perfluorotoluene, 2.9 g of an oily residue were recovered, which were found to comply with the following structure:

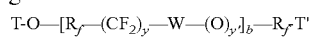
T-O—[$R_f$—(CF$_2$)$_y$—W—(O)$_{y'}$]$_b$—$R_f$-T' wherein
W are divalent perfluoro-cyclohexadienic units of formula —$C_6F_5Z$—, with Z being —CF$_3$;
y, y'=0 or 1
$R_f$ are perfluoropolyether blocks of formula:

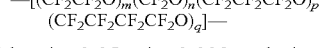
—[(CF$_2$CF$_2$O)$_m$(CF$_2$O)$_n$(CF$_2$CF$_2$O)$_p$(CF$_2$CF$_2$CF$_2$CF$_2$O)$_q$]— with m/n=0.95, p/n=0.008 and q/n=0.003
b=5
$M_n$=2.5×10$^4$
T and T' are: —CF$_3$ (26%), —CF$_2$Cl (13%), —CF$_2$CF$_2$Cl (3%), —CF$_2$COF (58%).

Presence of perfluoro-cyclohexadienic units was confirmed by IR spectroscopy (peaks at 1744 and 1700 cm$^{-1}$, related to C═C stretching modes).

5 b) Esterification of Terminal Acyl Fluoride End-Groups

Addition product obtained as above detailed was transformed in corresponding ester following procedure described in example 1b), and quantitative conversion of acyl fluoride groups into isobutyl esters group was confirmed by IR spectroscopy.

EXAMPLE 6

Addition of a Perfluoropolyether Peroxide (Mn=30.000) Having P.O.=0.49 on Perfluoropyridine 6a) Addition Reaction Same procedure of example 2a) was followed, but using 15 g of perfluoropyridine, 2.0 g of the PFPE peroxide and 5.0 g of H-GALDEN® ZT 85 hydrofluoroether as solvent. After recovery of unreacted perfluoropyridine, 2.1 g of an oily residue were recovered, which were found to comply with the following structure:

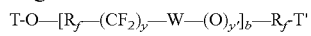

wherein

W are divalent unsaturated cyclic units of formula —$C_6F_5N$—;

y, y'=0 or 1

$R_f$ are perfluoropolyether blocks of formula:

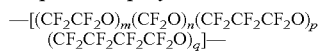

with m/n=0.96, p/n=0.008 and q/n=0.0053 b=6

$M_n$=2.6×10$^4$

T and T' are: —$CF_3$ (27%), —$CF_2Cl$ (11%), —$CF_2CF_2Cl$ (3%), —$CF_2COF$ (59%).

Presence of unsaturated cyclic units was confirmed by IR spectroscopy (peaks at 1761 and 1721 cm$^{-1}$, related to C=C stretching modes).

6 b) Esterification of Terminal Acyl Fluoride End-Groups

Addition product obtained as above detailed was transformed in corresponding ester following procedure described in example 1b), and quantitative conversion of acyl fluoride groups into isobutyl esters group was confirmed by IR spectroscopy.

EXAMPLE 7

Use of the Compound Obtained from Example 3 as Thermal Stabilizer in PFPE Heat Exchange Fluids Ester of the addition product obtained from Example 3b) as above detailed was added to a PFPE fluid as thermal stabilizing additive; the composition so obtained was used as heat exchange fluid in vapour phase heating (VPH) applications. Thus, 70 ml of GALDEN® HS 260 comprising 1% wt of product from example 4 was introduced in a glass vial equipped with a refluxing cooler and containing a stainless steel (AISI 316) plaque totally immersed in the fluid. In the vapour zone glass film specimens were introduced so as to visually inspect condensation residues. Test was carried out maintaining a liquid phase temperature of 265° C., corresponding to a vapour temperature of about 262° C., for 165 hours. Initial viscosity of the composition was found to be 9.8 cSt at 20° C. After the test, the composition was found to be colourless and substantially unchanged, with a viscosity of 10.0 cSt at 20° C. Acidity testing was negative, i.e. less than detection limit of the technique (<0.5 meq/kg) and no chemical and structural modification was evidenced by $^{19}$F-NMR with respect to the initial composition. The metallic plaque was recovered perfectly shiny with no dots of corrosion. Glass specimens immersed during testing in the vapour phase were recovered perfectly clean with no sign of deposited residues.

COMPARATIVE EXAMPLE 8

Same test as detailed in example 7 was repeated but using as heat exchange fluid bare GALDEN® HS 260 with no added stabilizer ester compound from ex. 3 b).

Fluid was found to possess after the test a viscosity of 9.8 cSt at 20° C.; acidity was found to be as high as 3.7 meq/kg and $^{19}$F-NMR measurements evidenced structural variations due to partial metal-induced degradation (decrease of the —$CF_2O$— recurring units and —$OCF_3$ end groups; increase of perfluoropropyl end groups —$OC_3F_6$).

Surface of the metal plaque was found to be darkened and partially corroded.

EXAMPLE 9

Use of the Compound Obtained from Example 3b) as Thermal Stabilizer in PFPE Lubricating Oils Ester material obtained from example 3 was used as thermal stabilizer of a PFPE lubricating oil. Evaluation has been carried out according to the micro-oxydation methodology as initially described in Carl E. Snyder, Jr. and Ronald E. Dolle, Jr., ASLE Transactions, Vol. 19 (3), pages 171-180 (1976).

The measuring device consists of an open glass vial containing fluid under testing, with metal disks fully immersed in said fluid. Vial is maintained at set-point temperature while an air flow is bubbled into the fluid; weight is accurately monitored as a function of time. Fluid is deemed to undergo degradation when loss in weight is beyond 5% wt. Test was operated with AISI 304 steel and Ti alloy (Al=6%, V=4%) specimens, at a temperature of 280° C., with an air flow of 1.0 Nl/h.

Loss in weight of a FOMBLIN® M30 PFPE lubricant comprising 1% wt of additive according to example 4 was found to be of about 1.0% after 96 hours and of about 2.5% after 120 h.

EXAMPLE 10

Use of the Compound Obtained from Example 3b) as Thermal Stabilizer in PFPE Lubricating Oils Same procedure as detailed in example 9 was followed, but using ester product from example 1b) at 1% wt concentration in FOMBLIN® M30 PFPE lubricant. Loss in weight was found to be of about 1.0% after 48 hours and of about 2.5% after 72 h.

COMPARATIVE EXAMPLE 11

Same test as described in example 9 was repeated but with no stabilizer, i.e. using FOMBLIN® M30 PFPE oil free from compound according to example 4. Loss in weight after 24 hours exceeded 5% so that fluid was considered as completely degraded.

EXAMPLE 12

Use of the Compound Obtained from Example 3b) as Thermal Stabilizer in Hydrofluoroethers To 50 g of a hydrofluoroether of formula $HCF_2$—$(CF_2CF_2O)_n(CF_2O)_m$—$CF_2H$ having n/m=2.2, $M_n$=1240, and boiling range 250-260° C., 0.3 g of the ester product from example 3b) were added in a glass flask. A round-shaped chromium steel (100Cr6) specimen (25 mm diameter, 2 mm thickness) was introduced in the glass flask and mixture was refluxed (225° C.) for 25 hours. After cooling under air, solution was clear and limpid; the steel specimen surface was shiny, with no evidence of corrosion. A sample was submitted to acidity measurement via potentiometric titration in a water/ acetone (1/3 v/v) solution, using an aqueous solution of NaOH (0.01 M). Detection limit for carboxylic acid and HF is about 0.5 meq kg$^{-1}$. Acidity of solution from present example was undetectable. Loss in weight after thermal treatment was found to be 3.6% wt (based on initial weight).

COMPARATIVE EXAMPLE 13

Same procedure as detailed in example 12 was repeated, but without addition of ester product from example 3b). After thermal treatment in analogous conditions, steel specimen surface has lost its polish and showed spots of corrosion. Acidity of the solution (due both to carboxylic moieties and HF) was found to be 7.3 meq/kg and loss in weight was found to be 7.4% wt (based on initial weight).

EXAMPLE 14

Use of the Compound Obtained from Example 1b) for the Manufactured of Cured Gum 30 g of the addition product from example 1b) were mixed with 2.5 g of radical generator LUPEROX® 101XL45 (45% wt 2,5-bis(ter-butylperoxy)-2,5-dimethylhexane and 55% wt CaCO$_3$ and SiO$_2$) and 3.5 of crosslinking promoter DRI-MIX® 75% TAIC (75% wt triallyl isocyanurate; 25% wt SiO$_2$) and heated under vigorous stirring up to 100° C. under nitrogen so as to eliminate oxygen. Mixture was then heated up to 190° C., temperature at which a prompt gas evolution and noticeable increase in viscosity is observed. Heating was continued for 30 minutes. A cured gum non-meltable and insoluble in fluorinated solvents (GALDEN® HT55, hexafluorobenzene; H-GALDEN® ZT85) was obtained. A sample of said cured gum was analyzed by DSC showing a glass transitino temperature at −98° C.; no other transition was detected (notably no melting point).

EXAMPLE 15

Use of the Compound Obtained from Example 1b) for the Manufactured of Cured Gum

Same procedure of example 14 was followed but, as crosslinking system, using instead of LUPEROX and DRI-MIX combination, the PFPE peroxide as detailed in example 1a). Mixture was heated 30 minutes at each of the following increasing temperature: 180° C., 190° C., 200° C. A cured gum non-meltable and insoluble in fluorinated solvents (GALDEN® HT55, hexafluorobenzene; H-GALDEN® ZT85) was obtained.
A sample of said cured gum was analyzed by DSC showing a glass transitino temperature at −104° C.; no other transition was detected (notably no melting point).

EXAMPLE 16

Use of the Compound Obtained from Example 1b) for the Manufactured of Polystyrene Graft Copolymer 16 g of the ester product from example 1b) and 4.0 g of styrene were heated under nitrogen at a rate of 0.5° C./20 minutes up to 190° C. A white hard solid (19.6 g) was obtained after cooling.
After milling, a sample of the ground powder was submitted to extraction procedures.

First, 5.0 g of product were extracted at reflux with GALDEN® HT 55 PFPE (3×3 hours at reflux) and phases separated by ultracentrifugation. Combined liquid extracts were found to contain 3.2 of a viscous oil, which was found by NMR spectroscopy to comprise 99.6% wt fraction of adduct from ex. 1b) units and 0.4% wt (poly)styrene units.

Solid residue was further extracted at reflux with toluene (3×3 hours at reflux) and phases separated by ultracentrifugation. Combined liquid extracts were found to contain 0.1 g of a solid residue, which was found by DSC to comprise about 90% wt (poly)styrene units.

White solid residue (1.4 g), insoluble both in GALDEN® HT 55 PFPE and toluene, was analyzed by DSC and found to comprise about 60% polystyrene units component and about 40% (per)fluoropolyether adduct units (from ex. 1b)) component, said components being chemically grafted.

The invention claimed is:

1. A process for the addition of at least one (per)fluoropolyether peroxide comprising at least one peroxidic moiety and at least one fluoropolyoxyalkene chain (chain R$_f$) [peroxide (P)] onto a per(halo)fluorinated aromatic compound [compound (F)], so as to yield an addition compound of said compound (F), said addition compound [compound (A)] comprising at least one perfluorinated non-aromatic cyclic moiety having at least two substituents comprising a chain R$_f$ and, optionally, conjugated or non conjugated double bond(s).

2. The process of claim 1, wherein the peroxide (P) complies with formula (I) here below:

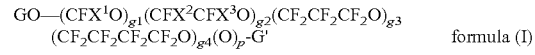

formula (I)

wherein
X$^1$, X$^2$, X$^3$ equal to or different from each other and at each occurrence are independently —F, or —CF$_3$;

G and G', equal to or different from each other, are independently selected from the group consisting of —CF$_3$, —CF$_2$—CF$_3$, —CF$_2$Cl, —CF$_2$CF$_2$Cl, —CF$_2$—COF, and —COF;

g1, g2, g3, and g4, equal or different from each other, are independently integers ≧0, such that the number averaged molecular weight is in the range 280-200,000;

p is an integer >0.

3. The process of claim 1, wherein the compound (F) is perfluorinated, in that all its free valences are saturated with fluorine atoms.

4. The process of claim 3, wherein the compound (F) is selected from the group consisting of perfluorobenzene, perfluorobiphenyl, perfluoronaphthalene, perfluoroanthracene, perfluoropyridine, perfluorotoluene and derivatives thereof comprising one or more perfluorinated substituent(s).

5. A compound [compound (A)] comprising at least one perfluorinated non-aromatic cyclic moiety having chemically bound to at least two sp$^3$ hybridized carbon atoms a fluoropolyoxyalkene chain (chain R$_f$), and, optionally, conjugated or non conjugated double bond(s), said compound (A) being obtained by addition of at least one (per)fluoropolyether peroxide comprising at least one peroxidic moiety and at least one chain Rf [peroxide (P)] onto a perfluorinated aromatic compound [compound (F)].

6. The compound (A) of claim 5, said compound complying with formula here below,

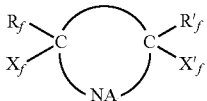

wherein:
R$_f$ and R'$_f$, equal to or different from each other are fluoropolyoxyalkylene chains bound to a sp$^3$ hybridized carbon atom either via an ether linkage or a C—C bond, optionally bound at their distal end group to another sp$^3$ hybridized carbon atom of a further NA moiety;

X$_f$ and X'$_f$, equal to or different from each other are selected from the group consisting of —F and C$_1$-C$_{12}$ per(halo)fluorocarbon substituents;

NA represents a per(halo)fluorinated non-aromatic cyclic moiety [moiety (NA)] optionally condensed with additional aromatic or non aromatic moieties, optionally having one or more conjugated or non conjugated double bond(s), optionally having one or more per(halo)fluorosubstituents and wherein said cyclic moiety comprises the two sp$^3$ hybridized carbon bearing R$_f$ and R'$_f$ substituents.

7. The compound (A) of claim 6, comprising chemically bound to sp$^3$ hybridized carbon atoms fluoropolyoxyalkylene chains (R$_f$, R'$_f$) of formula:

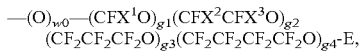

wherein:
w0 is zero or 1;
X1, X2, and X3 equal to or different from each other and at each occurrence are independently —F or —CF$_3$;
g1, g2, g3, and g4, equal to or different from each other, are independently integers ≧0, such that the number averaged molecular weight is in the range 280-200,000;
E is a group selected from the group consisting of —CF$_3$, —CF$_2$—CF$_3$, —CF$_2$Cl, —CF$_2$CF$_2$Cl, —COF, —CF$_2$—COF, and —CF$_2$OCOF, or is a group bonding directly or through an ether linkage another sp$^3$ hybridized carbon atom of a per(halo)fluorinated non-aromatic cyclic moiety.

8. A composition comprising the compound (A) according to claim 5 and at least one fluorinated ether fluid free from functional groups [fluid (H)].

9. The composition of claim 8, wherein the fluid (H) complies with formula (I A) or (I B) here below:

wherein:
R$^{H'}$ and R$^H$, equal to or different from each other, are independently selected from the group consisting of —C$_m$F$_{2m+1}$, —C$_n$F$_{2n+1-h}$H$_h$, —C$_p$F$_{2p+1-h'}$X$_{h'}$, —C$_z$F$_{2z}$OC$_y$F$_{2y+1}$, and —C$_u$F$_{2u-u'Hu'}$OC$_w$F$_{2w+1-w'}$H$_{w'}$ groups, with n, m, p, z, y, u, w being integers from 1 to 8, h, h', u' and w' being integers ≧1, chosen so that h≦2n+1, h'≦2p+1, u'≦2u, w'≦2w+1, X being a halogen atom selected from the group consisting of Cl, Br, and I;

R$^H_f$ is a fluoropolyoxyalkene chain comprising repeating units R$^{Ho}$, said repeating units being selected from the group consisting of:
(i) —CFXO—, wherein X is F or CF$_3$,
(ii) —CF$_2$CFXO—, wherein X is F or CF$_3$,
(iii) —CFXCF$_2$O—, wherein X is F or CF$_3$,
(iv) —CF$_2$CF$_2$CF$_2$O—, and
(v) —CF$_2$CF$_2$CF$_2$CF$_2$O—;

wherein
r is equal to zero or 1;
J is a divalent hydrocarbon radical having 1 to 12 carbon atoms, linear or branched, aliphatic or aromatic;
j is equal to zero or 1.

10. A composition comprising the compound (A) according to claim 5 and at least one lubricant.

11. The composition of claim 10 comprising a lubricant comprising at least one oil selected from the following group consisting of:

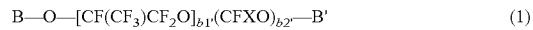  (1)

wherein:
X is equal to —F or —CF$_3$;
B and B', equal to or different from each other, are selected from the group consisting of —CF$_3$, —C$_2$F$_5$, and —C$_3$F$_7$;
b1' and b2', equal to or different from each other, are independently integers ≧0 selected such that the b1'/b2' ratio is comprised between 20 and 1,000; and b1'+b2' is in the range 5 to 250; should b1' and b2' be both different from zero, the different recurring units are statistically distributed along the chain;

$$C_3F_7O—[CF(CF_3)CF_2O]_{o'}-D \quad (2)$$

wherein
D is equal to —C$_2$F$_5$ or —C$_3$F$_7$;
o' is an integer from 5 to 250;

$$\{C_3F_7O—[CF(CF_3)CF_2O]_{dd'}—CF(CF_3)—\}_2 \quad (3)$$

wherein
dd' is an integer between 2 and 250;

  (4)

wherein
X is equal to —F or —CF$_3$;
C' and C", equal to or different from each other, are selected from the group consisting of —CF$_3$, —C$_2$F$_5$, and —C$_3$F$_7$;
c1', c2' and c3', equal to or different from each other, are independently integers ≧0 such that c1'+c2'+c3' is in the range 5 to 250; should at least two of c1', c2' and c3' be different from zero, the different recurring units are statistically distributed along the chain;

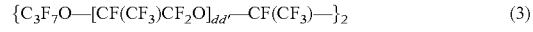  (5)

wherein
D and D', equal to or different from each other, are selected from the group consisting of —CF$_3$, —C$_2$F$_5$, and —C$_3$F$_7$;
d1', d2', d3', and d4', equal to or different from each other, are independently integers ≧0, such that d1'+d2'+d3'+d4' is in the range 5 to 250, and the d2'/d1' ratio is comprised between 0.1 and 5; should at least one of d1' to d4' be both different from zero, the different recurring units are statistically distributed along the chain;

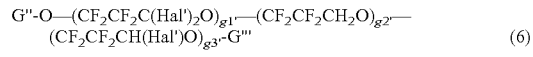  (6)

wherein
G" and G'", equal to or different from each other, are selected from the group consisting of —CF$_3$, —C$_2$F$_5$, and —C$_3$F$_7$;
Hal', equal to or different at each occurrence, is a halogen selected from the group consisting of F and Cl;
g1', g2', and g'3, equal to or different from each other, are independently integers ≧0, such that g1'+g2'+g3' is in the range 5 to 250; should at least two of g1', g2' and g3' be different from zero, the different recurring units are statistically distributed along the chain;

  (7)

wherein
L and L', equal to or different from each other, are selected from the group consisting of —$C_2F_5$ and —$C_3F_7$;
l' is an integer in the range 5 to 250;

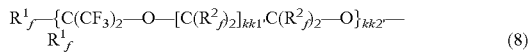  (8)

wherein
$R^1_f$ is a perfluoroalkyl group having from 1 to 6 carbon atoms;
$R^2_f$ is equal to —F or perfluoroalkyl group having from 1 to 6 carbon atoms;
kk1' is an integer from 1 to 2;
kk2' represents a number in the range 5 to 250.

12. A curable composition comprising the compound (A) according to claim 5 and a curing agent.

13. The composition of claim 12, wherein the compound (A) has one or more conjugated or non conjugated double bond(s) in at least one of its non-aromatic cyclic moieties (NA).

14. The composition of claim 12, wherein the curing agent is selected from the group consisting of dialkyl peroxides; dicumyl peroxide; dibenzoyl peroxide; di-tert-butyl perbenzoate; bis[1,3-dimethyl-3-(tert-butylperoxy)butyl]carbonate, and (per)fluoropolyether peroxides (P) comprising at least one peroxidic moiety and at least one fluoropolyoxyalkene chain (chain $R_f$).

15. A grafted copolymer comprising a polymer matrix and moieties of the compound (A) according to claim 5 grafted thereto.

* * * * *